(12) United States Patent
Berge

(10) Patent No.: US 11,280,995 B2
(45) Date of Patent: Mar. 22, 2022

(54) ELECTROSTATICALLY ACTUATED DEVICE

(71) Applicant: LACLAREE, Lyons (FR)

(72) Inventor: Bruno Berge, Lyons (FR)

(73) Assignee: LACLAREE, Lyons (FR)

( * ) Notice: Subject to any disclaimer, the term of this patent is extended or adjusted under 35 U.S.C. 154(b) by 235 days.

(21) Appl. No.: 16/329,599

(22) PCT Filed: Aug. 30, 2017

(86) PCT No.: PCT/EP2017/071712
§ 371 (c)(1),
(2) Date: Feb. 28, 2019

(87) PCT Pub. No.: WO2018/041866
PCT Pub. Date: Mar. 8, 2018

(65) Prior Publication Data
US 2019/0258085 A1 Aug. 22, 2019

(30) Foreign Application Priority Data
Sep. 1, 2016 (FR) ..................... 16/58119

(51) Int. Cl.
G02B 26/00 (2006.01)
G02C 7/08 (2006.01)
(Continued)

(52) U.S. Cl.
CPC .......... *G02B 26/004* (2013.01); *F04B 19/006* (2013.01); *F04B 43/043* (2013.01);
(Continued)

(58) Field of Classification Search
CPC ........ G02C 7/085; G02C 7/081; G02C 7/083; G02B 3/12; G02B 3/14; G02B 26/004;
(Continued)

(56) References Cited

U.S. PATENT DOCUMENTS 5,284,179 A * 2/1994 Shikida ................ F04B 43/043
137/334
5,380,396 A * 1/1995 Shikida ................ F04B 43/043
118/728
(Continued)

FOREIGN PATENT DOCUMENTS

| CN | 1337086 A | 2/2002 |
|---|---|---|
| CN | 101389566 A | 3/2009 |

(Continued)

OTHER PUBLICATIONS

International Search Report for Application No. PCT/EP2017/071712; Date of Completion: Nov. 27, 2017; dated Dec. 5, 2017; 4 Pages.

(Continued)

*Primary Examiner* — Marin Pichler
(74) *Attorney, Agent, or Firm* — Cantor Colburn LLP

(57) ABSTRACT

The present invention relates to an electrostatically actuated device comprising at least first chamber, an electrode chamber comprising a deformable electrode. The deformable electrode is disposed in the electrode chamber such as to form a first electrode chamber and a second electrode chamber.

17 Claims, 5 Drawing Sheets

(51) Int. Cl.
*F04B 19/00* (2006.01)
*F04B 43/04* (2006.01)
*F04B 43/06* (2006.01)
*G02B 3/14* (2006.01)

(52) U.S. Cl.
CPC .............. *F04B 43/06* (2013.01); *G02C 7/085* (2013.01); *G02B 3/14* (2013.01)

(58) Field of Classification Search
CPC ........ F04B 19/006; F04B 19/04; F04B 43/00; F04B 43/04; F04B 43/043; F04B 43/06; F04B 43/073; F04B 43/0733
USPC ............ 351/159.03, 159.04, 159.34, 159.39, 351/159.4, 159.68
See application file for complete search history.

(56) References Cited

U.S. PATENT DOCUMENTS

| | | | |
|---|---|---|---|
| 7,547,568 | B2 | 6/2009 | Chou et al. |
| 7,619,610 | B2 | 11/2009 | Kawahara et al. |
| 7,768,712 | B2 | 8/2010 | Silver et al. |
| 8,002,403 | B2 | 8/2011 | Silver et al. |
| 8,371,829 | B2 | 2/2013 | Jaeb et al. |
| 8,382,280 | B2 | 2/2013 | Gupta et al. |
| 9,874,665 | B2 | 1/2018 | Bolis |
| 2010/0053543 | A1 | 3/2010 | Silver et al. |
| 2010/0208195 | A1* | 8/2010 | Gupta .................. G02C 7/085 351/159.68 |
| 2012/0120986 | A1 | 5/2012 | Konno et al. |
| 2014/0271238 | A1 | 9/2014 | Badger et al. |
| 2019/0227346 | A1 | 7/2019 | Berge |

FOREIGN PATENT DOCUMENTS

| | | |
|---|---|---|
| CN | 101506714 A | 8/2009 |
| EP | 0518524 A2 | 12/1992 |
| FR | 3053800 A1 | 1/2018 |
| JP | H11336673 A | 12/1999 |
| JP | 2003276194 A | 9/2003 |
| JP | 2006072267 A | 3/2006 |
| JP | 2009524838 A | 7/2009 |
| JP | 2012518197 A | 8/2012 |
| JP | 2013532246 A | 8/2013 |
| JP | 5493205 | 5/2014 |
| WO | 0028650 A1 | 5/2000 |
| WO | 2015091836 A1 | 6/2015 |
| WO | 2015114514 A1 | 8/2015 |

OTHER PUBLICATIONS

Written Opinion for Application No. PCT/EP2017/071712; International Filing Date: Aug. 30, 2017; dated Dec. 5, 2017; 7 Pages.
English Translation of FR3053800A1; Date of Publication: Jan. 12, 2018; 17 Pages.
CN Office Action for Application No. 201780053722.5; dated Apr. 20, 2021
CN Search Report for Application No. 2017800537225; dated Mar. 1, 2019.
English Translation to CN Office Action for Application No. 201780053722.5; dated Apr. 20, 2021.
English Translation to JP Search Report for Application No. 2019-511703; dated Apr. 14, 2021.
JP Office Action for Application No. 2019-511703.
JP Search Report for Application No. 2019-511703; dated Apr. 13, 2021.

\* cited by examiner

ELECTROSTATICALLY ACTUATED DEVICE

CROSS REFERENCE TO RELATED APPLICATIONS

This application is a National Stage of PCT Application No. PCT/EP2017/071712 filed on Aug. 30, 2017, which claims priority to French Patent Application No. 16/58119 filed on Sep. 1, 2016, the contents each of which are incorporated herein by reference thereto.

TECHNICAL FIELD OF THE INVENTION

This invention relates to the field of displacement machines for liquids, which are used in particular in variable ophthalmic devices in order to improve the quality of vision of a patient by using liquids in the lenses as described in the patent application FR 16/56610. More specifically, this invention deals with electrostatics pump and precisely with electrostatics actuated devices using a membrane to displace at least one fluid.

BACKGROUND

Some classical devices used to displace an amount of fluid, have been designed with micro-fabrication technologies like MEMS, using piezoelectric actuators for instance. The main problem raised by these concepts is that they are usually designed for continuous operations like circulating continuously small fluxes of liquids through a pipe. As a consequence they are slow, and exhibit very low power efficiency, and for some one a power efficiency less than 0.1. Clearly they are not adapted to the need of the reversible pumping of a limited quantity of liquid and using low power consumption.

SUMMARY OF THE INVENTION

The present invention relates to a fluid electrostatically actuated device, which will serve to push the fluids into a fluid cell with a deformable electrode, in order to control the optical power of the fluid lens. Contrarily to a continuous electrostatically actuated device, the electrostatically actuated device according to the invention will serve to push a limited volume only, but it will do so very reversibly, and with reduced friction. This electrostatically actuated device may be part of pair of spectacles using variable fluid lenses as variable power glasses. According to an aspect of the invention, two electrostatically actuated devices according to the invention, one for each side, may be located in the temples of the pair of spectacles, and will be actuated by a battery.

In order to achieve this objective, the present invention provides, according to a first aspect, an electrostatically actuated device comprising at least one:
first chamber: the first chamber comprises a first primary fluid passage; the first primary fluid passage emerging outwardly;
primary partition wall: the primary partition wall comprises a first primary surface, a second primary surface and a plurality of second primary fluid passages; the second primary surface of the primary partition wall defines at least partially the first chamber;
electrode chamber: the electrode chamber is defined adjacent to the first primary surface;
deformable electrode: the deformable electrode comprises a first deformable electrode surface, a second deformable electrode surface; the deformable electrode is disposed in the electrode chamber such as to form a first electrode chamber and a second electrode chamber;
electrode; the electrode is configured to cooperate with the deformable electrode such as to actuate the deformable electrode between at least a first position and a second position;
the first electrode chamber is comprised between the first deformable electrode surface and the first primary surface and the first electrode chamber fluidly communicates with the first chamber via the plurality of second primary fluid passage when the deformable electrode is actuated between first position and the second position.

Thus, this configuration allows the displacement of a second fluid squeezing the first fluid inside or outside the electrode chamber. Another aspect of the invention is to add a limitation to the expansion of the electrode chamber in order to control the movement of the deformable electrode.

According to an embodiment of the present invention, the first electrode chamber is fluidly isolated from the second electrode chamber. In others words, according to an embodiment of the present invention, the first electrode chamber does not fluidly communicate to the second electrode chamber.

Thus, this configuration allows the first fluid moving between the first electrode chamber and the first chamber and the second fluid between the second chamber and the second electrode chamber.

According to an embodiment of the present invention, the electrostatically actuated device comprises at least one:
second chamber: the second chamber comprises a first secondary fluid passage; the first secondary fluid passage emerging outwardly;
secondary partition wall: the secondary partition wall comprises a first secondary surface, a second secondary surface and a plurality of second secondary fluid passages; the first secondary surface faces the first primary surface, the secondary partition wall defines at least partially the second chamber;
the second electrode chamber is comprised between the second deformable electrode surface and the first secondary surface and the second deformable electrode chamber fluidly communicates with the second chamber via the plurality of second secondary fluid passage when the deformable electrode is actuated between first position and the second position.

Thus, this configuration allows the displacement of a second fluid. Another aspect of the invention is to have an antagonist displacement between the fluids, which means that when the first fluid is pushed out of the electrode chamber the second fluid is introduced in the electrode chamber.

According to an embodiment of the present invention, the wall distance between the primary partition wall and the secondary partition wall is smaller than 600 µm.

According to an embodiment of the present invention, the wall distance between the primary partition wall and the secondary partition wall is smaller than 400 µm.

According to an embodiment of the present invention, the wall distance between the primary partition wall and the secondary partition wall is smaller than 200 µm.

According to an embodiment of the present invention, the wall distance between the primary partition wall and the secondary partition wall is comprised between 5 µm and 175 µm.

Thus, this configuration allows having a stronger pumping pressure on the different fluids.

According to an embodiment of the present invention, a dimension of the electrode chamber and/or the wall distance between the primary partition wall and the secondary partition wall varies.

According to an embodiment of the present invention, a dimension of the electrode chamber and/or the wall distance between the primary partition wall and the secondary partition wall varies spatially.

According to an embodiment of the present invention, the primary partition wall is configured to form an angle with the secondary partition wall comprised between 0° and 60°, in particular between 0° and 45° and preferably between 0° and 30°.

According to an embodiment of the present invention, the wall distance between the primary partition wall and the secondary partition wall varies such as to form an angle, between the primary partition wall and the secondary partition wall, comprised between 0° and 60°, in particular between 0° and 45° and preferably between 0° and 30°.

Thus, this configuration allows having a better control of the volumes of the first electrode chamber and the second electrode chamber.

According to an embodiment of the present invention, the deformable electrode comprises a deformable dielectric layer and at least one electroconducting portion.

Thus, this configuration allows having a displacement of the electrode via an electric field.

According to an embodiment of the present invention, the primary partition wall comprises a primary partition wall surface area and a primary electroconducting pad; the primary electroconducting pad comprises a main primary electroconducting pad having a main primary surface area and at least one auxiliary primary electroconducting pad having an auxiliary primary surface area; the main primary electroconducting pad and the at least one auxiliary primary electroconducting pad are electrically insulated from each others.

Thus, this configuration allows having a digital control of the electrode and divides the electrode movement into discrete zones thus resulting in discrete steps for the pushed fluid volume.

According to an embodiment of the present invention, the secondary partition wall comprises a secondary partition wall surface area and a secondary electroconducting pad; the secondary electroconducting pad comprises a main secondary electroconducting pad having a main secondary surface area and at least one auxiliary secondary electroconducting pad having an auxiliary secondary surface area; the main secondary electroconducting pad and the at least one auxiliary secondary electroconducting pad are electrically insulated from each others.

Thus, this configuration allows having a digital control of the electrode and divides the electrode movement into discrete zones thus resulting in discrete steps for the pushed fluid volume.

According to an embodiment of the present invention, the primary partition wall comprises a first insulating layer configured to insulate the at least one electroconducting portion of the deformable electrode from the primary electroconducting pad of the primary partition wall.

According to an embodiment of the present invention, the secondary partition wall comprises a second insulating layer configured to insulate the at least one electroconducting portion of the deformable electrode from the secondary electroconducting pad of the secondary partition wall.

According to an embodiment of the present invention, the pads spacing between the main primary electroconducting pad and the auxiliary primary electroconducting pad and/or between an auxiliary primary electroconducting pad and another is comprised between 10 μm and 1 mm.

Thus, this configuration provides insulation between the primary electroconducting pads.

According to an embodiment of the present invention, at least one of the partition walls among the primary partition wall and the secondary partition wall is partially made of at least one crystalline material.

According to an embodiment of the present invention, the crystalline material is silicon, silicon dioxide, aluminum oxide, sapphire, germanium, gallium arsenide, indium phosphide, or an alloy of the preceding mentioned material.

Thus, this configuration provides at least one of the partition walls among the primary partition wall and the secondary partition wall which can be etched.

According to an embodiment of the present invention, at least one of the partition walls among the primary partition wall and the secondary partition wall is partially made of at least one semi-crystalline material.

According to an embodiment of the present invention, the semi-crystalline material is made of polymers, sol-gel, silicon, silicon dioxide, aluminum oxide, sapphire, germanium, gallium arsenide, indium phosphide, or an alloy of the preceding mentioned material.

Thus, this configuration provides at least one of the partition walls among the primary partition wall and the secondary partition wall which can be etched or anisotropically etched.

According to an embodiment of the present invention, at least one of the partition walls among the primary partition wall and the secondary partition wall is partially made of a porous material, natural fabrics or artificial fabrics.

According to an embodiment of the present invention, the natural fabrics or artificial fabrics are ordered or disordered.

According to an embodiment of the present invention, the porous material, natural fabrics or artificial fabrics is partially made of polymers, elastomers, amorphous carbon, Kevlar, carbon or metal.

Thus, this configuration allows having a substantially plane partition wall.

According to an embodiment of the present invention, the first electrode chamber comprises a first volume and/or the second electrode chamber comprises a second volume; the first volume and/or the second volume are controlled by a capacitance measurement.

Thus, this configuration allows the control of the first volume and/or of the second volume by a capacitance measurement more exactly by measuring the frequency of a relaxation oscillator, which depends on the capacitance for example.

According to an embodiment of the present invention, the first electrode chamber comprises a first volume and/or the second electrode chamber comprises a second volume; the capacitance of the device varies with the first volume and/or the second volume.

According to an embodiment of the present invention, the first position defines a first primary contact surface of the first deformable portion; the first primary contact surface of first deformable portion represents the contact surface between the first deformable portion and the first primary surface at the first position.

According to an embodiment of the present invention, the second position defines a second primary contact surface of the first deformable portion; the second primary contact surface of first deformable portion represents the contact surface between the first deformable portion and the first primary surface at the second position.

According to an embodiment of the present invention, the first primary contact surface is comprised between the first position and an extremity of the first deformable portion.

According to an embodiment of the present invention, the second primary contact surface is comprised between the second position and an extremity of the first deformable portion.

According to an embodiment of the present invention, the second primary contact surface is greater than the first primary contact surface.

According to an embodiment of the present invention, the capacity formed by the first deformable portion and the first primary surface increases when the deformable electrode is actuated from the first position to the second position.

According to an embodiment of the present invention, the capacity formed by the first deformable portion and the first primary surface may decrease when the deformable electrode is actuated from the second position to the first position.

According to an embodiment of the present invention, the first position defines a first secondary contact surface of the second deformable portion; the first secondary contact surface of second deformable portion represents the contact surface between the second deformable portion and the first secondary surface at the first position.

According to an embodiment of the present invention, the second position defines a second secondary contact surface of the second deformable portion; the second secondary contact surface of second deformable portion represents the contact surface between the second deformable portion and the first secondary surface at the second position.

According to an embodiment of the present invention, the first secondary contact surface is comprised between the first position and an extremity of the second deformable portion.

According to an embodiment of the present invention, the second secondary contact surface is comprised between the second position and an extremity of the second deformable portion.

According to an embodiment of the present invention, the second secondary contact surface is smaller than the first secondary contact surface.

According to an embodiment of the present invention, the capacity formed by the second deformable portion and the first secondary surface decreases when the deformable electrode is actuated from the first position to the second position.

According to an embodiment of the present invention, the capacity formed by the first deformable portion and the first secondary surface increases when the deformable electrode is actuated from the second position to the first position.

Thus, the first volume and second volume are complementary when the devices varies the first volume by an amount dV, the second volume varies from an amount –dV.

According to an embodiment of the present invention, a power supply configured to actuate the deformable electrode and a voltage controller configured to supply an alternative current and/or an alternative voltage from the power supply to the deformable electrode.

Thus, this configuration allows actuating the deformable electrode.

According to an embodiment of the present invention:
the plurality of second primary fluid passage comprises a first primary opening on the first primary surface having a first primary open surface area and a second primary opening on the second primary surface having a second primary open surface area: the first primary open surface area is smaller than the second primary open surface area; and/or,
the plurality of second secondary fluid passage comprises a first secondary opening on the first secondary surface having a first secondary open surface area and a second secondary opening on the second secondary surface having a second secondary open surface area: the first secondary open surface area is greater than the second secondary open surface area.

According to an embodiment of the present invention, sum of the first primary open surface area of the plurality of second primary fluid passage may form a primary open surface area and/or the sum of the first secondary open surface area of the plurality of second secondary fluid passage may form a secondary open surface area.

According to an embodiment of the present invention:
the first primary open surface area is smaller than the second primary open surface area and the ratio between the first primary open surface area and the second primary open surface area is comprised between 0.001 and 0.5;
the primary open surface area is smaller than the primary partition wall surface area and the ratio between the primary open surface area and the primary partition wall surface area is comprised between 0.001 and 0.5;
the first secondary open surface area is smaller than the second secondary open surface area and the ratio between the first secondary open surface area and the second secondary open surface area is comprised between 0.001 and 0.5; and/or
the secondary open surface area is smaller than the secondary partition wall surface area and the ratio between the secondary open surface area and the secondary partition wall surface area is comprised between 0.001 and 0.5.

According to an embodiment of the present invention, the ratio between:
the first primary open surface area is smaller than the first secondary open surface area and the ration between the first primary open surface area and the first secondary open surface area is comprised between 0.01 and 0.4;
the primary open surface area is smaller than the primary partition wall surface area and the ratio between the primary open surface area and the primary partition wall surface area is comprised between 0.01 and 0.4;
the first secondary open surface area is smaller than the second secondary open surface area and the ratio between the first secondary open surface area and the second secondary open surface area is comprised between 0.01 and 0.4; and/or
the secondary open surface area is smaller than the secondary partition wall surface area and the ratio between the secondary open surface area and the secondary partition wall surface area is comprised between 0.01 and 0.4.

Thus, this configuration allows having at the same time a large electrode area facing the membrane in order to maximize the electrostatic actuation and an effective fluidic communication through the partition wall.

The present invention relates to spectacles comprising an electrostatically actuated device according to one of the previous embodiments and a power supply configured to actuate the deformable electrode.

According to an embodiment of the present invention, the spectacles comprise a voltage controller configured to supply an alternative current to the deformable electrode from the power supply.

BRIEF DESCRIPTION OF DRAWINGS

The foregoing and other purposes, features, aspects and advantages of the invention will become apparent from the following detailed description of embodiments, given by way of illustration and not limitation with reference to the accompanying drawings, in which.

DESCRIPTION OF THE INVENTION

Figure 1:
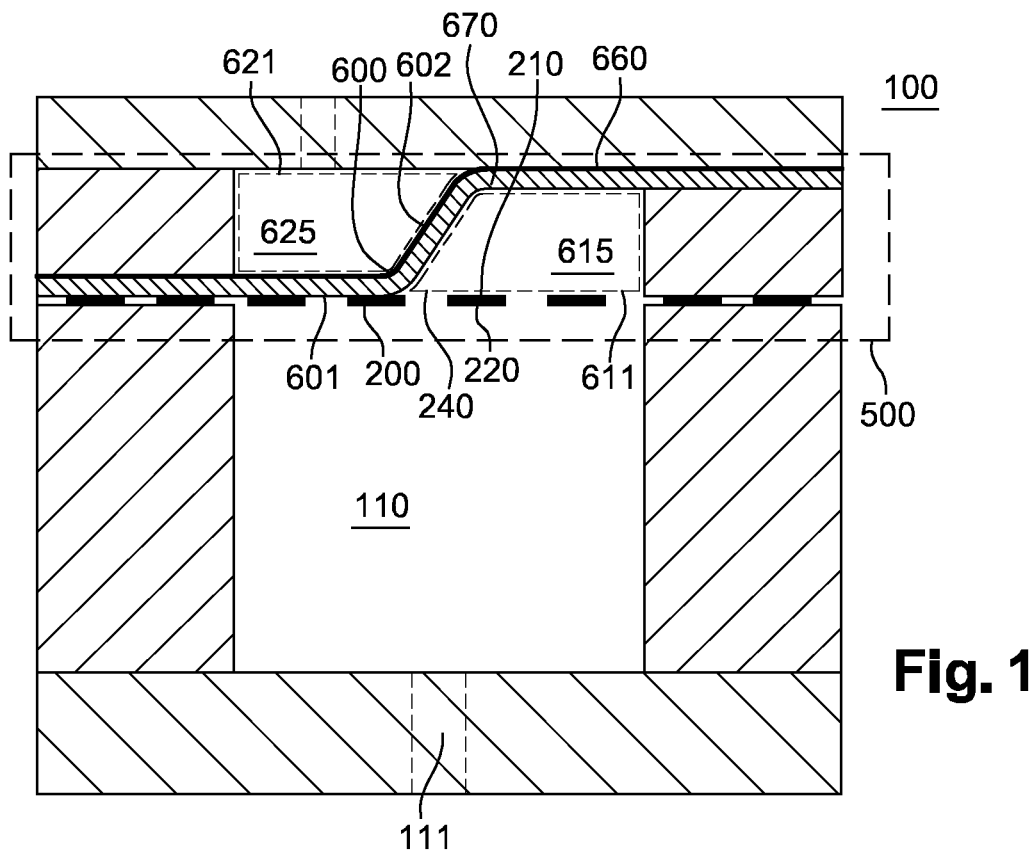
FIG. 1 presents a sectional view of an electrostatically actuated device with sectional view of a first chamber 110 and an electrode chamber 500 according to another embodiment of the present invention.

Specific embodiments of the invention will now be described in detail with reference to the accompanying figures. Like elements in the various figures are denoted by like reference numerals for consistency. Further, the use of "Fig." will be equivalent to the use of "Figure" in the description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Detailed Description of the Invention According to a 1st Embodiment

According to a first embodiment shown on FIG. 1, an electrostatically actuated device 100 configured to apply only a unidirectional force is disclosed. The electrostatically actuated device 100 comprises a first chamber 110. The first chamber 110 is configured to comprise a first fluid.

This first fluid may be configured to go through a first primary fluid passage 111, which means that the first fluid may have an engineered viscosity. This first primary fluid passage 111 may emerge outwardly, preferably outward of the first chamber 110. This first primary fluid passage 111 may be located on one side of the first chamber 110.

The first chamber 110 may be at least partially defined by a primary partition wall 200. This primary partition wall 200 may comprise a first primary surface 210, a second primary surface 220 and a plurality of second primary fluid passages 230. The second primary surface 220 may face the first chamber 110 and more precisely the second primary surface 220 may face the first primary fluid passage 111. The primary partition wall 200 may comprise a primary partition wall surface area 290 or more exactly the second primary surface 220 may comprise a primary partition wall surface area 290 facing the first chamber 110.

According to an embodiment (not shown), the first primary fluid passage 111 may not face the second primary surface 220 but may be located on a side wall. The first primary surface 210 may be opposite to the second primary surface 220, which means that the first primary surface 210 may be outside of the first chamber 110 and the plurality of second primary fluid passages 230 may allow the outside of the first chamber 110 to communicate with the inside of the first chamber 110.

The plurality of second primary fluid passages 230 may comprise at least one second primary fluid passage 240 and via this second primary fluid passage 240 the first fluid may penetrate the first chamber 110 or leave the first chamber 110. In some configuration, the first fluid may penetrate the first chamber 110 via the first primary fluid passage 111, may cross the first chamber 110 and leave the first chamber 110 via at least one second primary fluid passage 240, or vice versa, in other words the first primary fluid passage 111 and the at least one second primary fluid passage 240 may allow the first fluid to have a back-and-forth motion in the first chamber 110.

On the other side of the primary partition wall 200 adjacent to the first chamber 110 may be located an electrode chamber 500. This electrode chamber 500 may be defined, adjacent to the first primary surface 210 and may comprise a deformable electrode 600.

This deformable electrode 600 may be disposed in the electrode chamber 500 such as to form a first electrode chamber 615 and a second electrode chamber 625, in other words, the electrode chamber 500, which may have a main volume that may be separated in two volumes: a first electrode volume 611 and a second electrode volume 621. The first electrode chamber 615 does not fluidly communicate to the second electrode chamber 625.

The deformable electrode 600 may comprise a first deformable electrode surface 601, a second deformable electrode surface 602. The first electrode chamber 615 may be comprised between the first deformable electrode surface 601 and the first primary surface 210 and the first electrode chamber 615 may fluidly communicate with the first chamber 110 via the at least one second primary fluid passage 240 when the deformable electrode 600 may be actuated between a first position 691 and a second position 692.

The electrostatically actuated device 100 comprises an electrode which is part of the primary partition wall 200. This electrode may be configured to cooperate with the deformable electrode 600 such as to actuate the deformable electrode 600 between the first position 691 and the second position 692. The first electrode chamber 615 may comprise the first electrode volume 611 and the second electrode chamber 625 may comprise the second electrode volume 621.

The deformable electrode 600 may comprise a deformable dielectric layer 660 and a deformable electroconducting layer 670. The deformable electrode 600 may be made of a dielectric material which is metalized on one side. The preferred material may be PolyEthylene Terephtalate or polyethylene, or polypropylene or any other thin polymer or inorganic deformable electrode 600 having good dielectric properties.

When a voltage is applied between the deformable electroconducting layer 670 and the primary partition wall 200 in other words when the deformable electrode 600 and the primary partition wall 200 are electrified, the deformable electrode is attracted to the electrified primary partition wall 200 via an electrical field. The deformable electrode 600 is deformed and displaces some fluid through fluid passages in the partition wall.

Detailed Description of the Invention According to a $2^{nd}$ Embodiment

Figure 2:
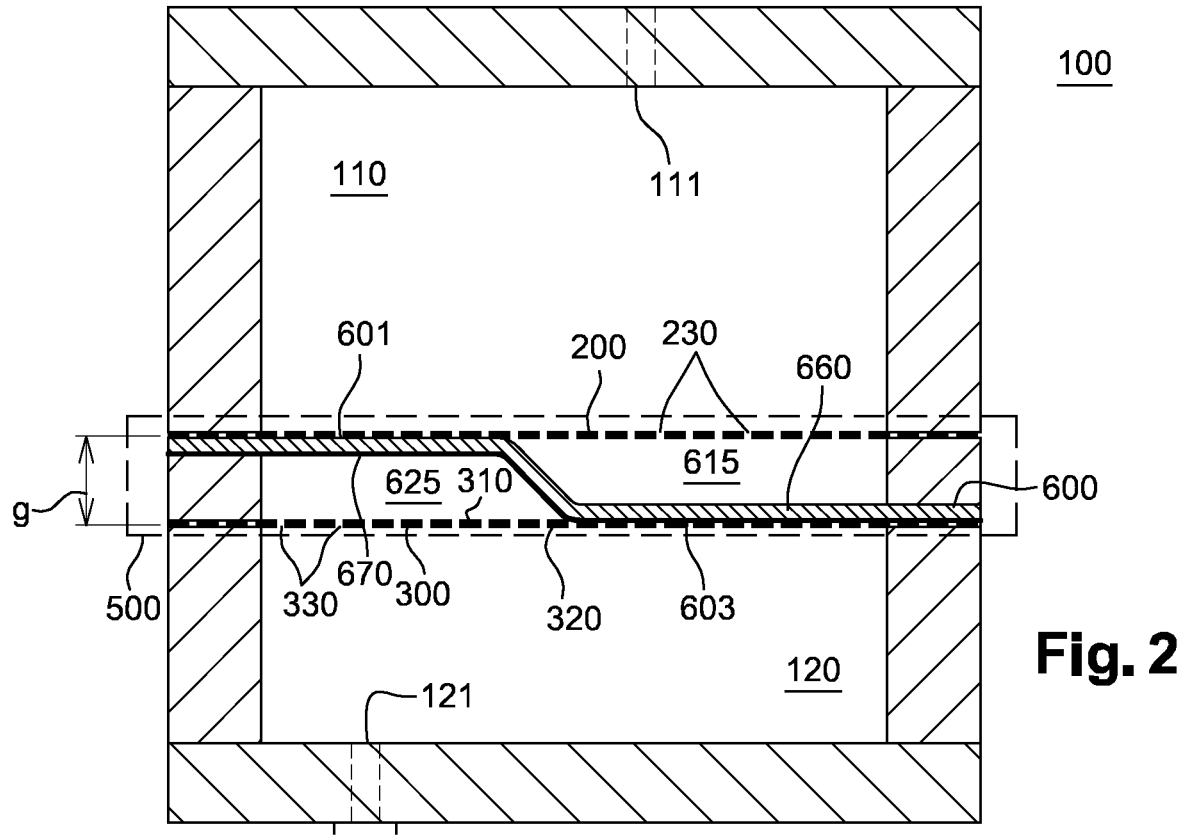
FIG. 2 represents a sectional view of an electrostatically actuated device according to an embodiment of the present invention.

According to a second embodiment shown on FIG. 2, in addition to the features described according to the first embodiment, the electrode chamber 500 comprises a secondary partition wall 300. The secondary partition wall 300 may comprise a first secondary surface 310, a second secondary surface 320 and a plurality of second secondary fluid passages 330. The plurality of second secondary fluid passages 330 may comprise at least one second secondary fluid passage 340. The first secondary surface 310 of the secondary partition wall 300 may face the first primary surface 210 of the primary partition wall 200, in other words the electrode chamber 500 may be comprised between the first secondary surface 310 and the first primary surface 210.

Adjacent to the secondary partition wall 300, there may be a second chamber 120. This second chamber 120, configured to comprise a second fluid, may be comprised in the electrostatically actuated device 100 and may be similar to the first chamber 110 according to one of the embodiments. This second chamber 120 may comprise a first secondary fluid passage 121. The first secondary fluid passage 121 may be configured to admit the second fluid into the second chamber 120. In other words, the second fluid can enter or leave the second chamber 120 via the first secondary fluid passage 121.

This second fluid may be configured to go through a first secondary fluid passage 121, which means that the second fluid may have an engineered viscosity. This first secondary fluid passage 121 may emerge outwardly, preferably outward of the second chamber 120. This first secondary fluid passage 121 may be located on one side of the second chamber 120.

The second chamber 120 may be at least partially defined by a secondary partition wall 300. This secondary partition wall 300 may comprise a first secondary surface 310, a second secondary surface 320 and the plurality of second secondary fluid passages 330. The second secondary surface 320 may face the second chamber 120 and more precisely the second secondary surface 320 may face the first secondary fluid passage 121. The first secondary surface 310 may be opposite to the second secondary surface 320, which means that the first secondary surface 310 may be outside of the first chamber 110 and the at least one second secondary fluid passage 330 may allow the outside of the second chamber 120 to communicate with the inside of the second chamber 120. The secondary partition wall 300 may comprise a secondary partition wall surface area or more exactly the second secondary surface 320 may comprise a secondary partition wall surface area facing the second chamber 120.

The plurality of second secondary fluid passages 330 may comprise at least one second secondary fluid passage 340 and via this at least one second secondary fluid passage 340 the second fluid may penetrate the second chamber 120 or leave the second chamber 120. In some configuration, the second fluid may penetrate the second chamber 120 via the first secondary fluid passage 121, cross the second chamber 120 and leave the second chamber 120 via at least one second secondary fluid passage 340, or vice versa, in other words the first secondary fluid passage 121 and the at least one second secondary fluid passage 330 may allow the second fluid to have a back-and-forth motion in the second chamber 120.

The second electrode chamber 625 may be comprised between the second deformable electrode surface 602 and the first secondary surface 310 and the second deformable electrode chamber 625 may fluidly communicate with the second chamber 120 via the at least one second secondary fluid passage 340 when the deformable electrode 600 may be actuated between the first position 691 and the second position 692.

Detailed Description of the Invention According to a $3^{rd}$ Embodiment

Figure 3:
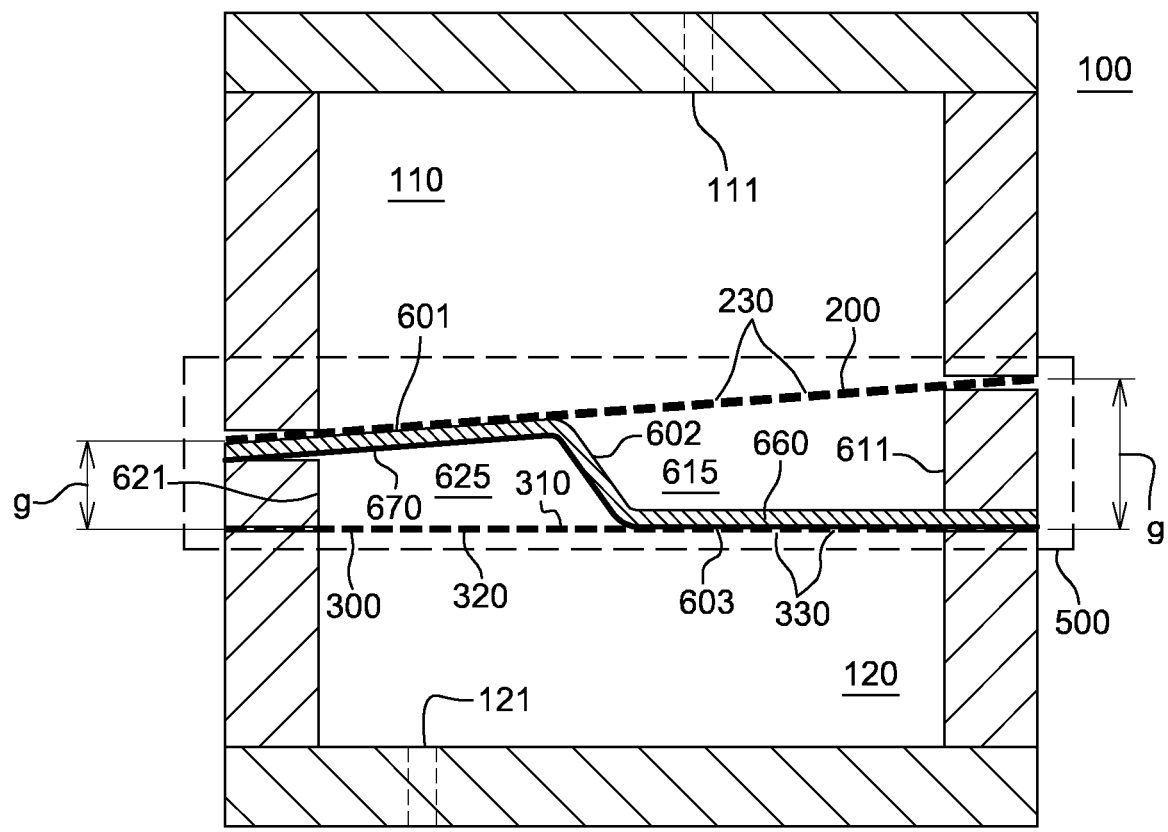
FIG. 3 shows a sectional view of an electrostatically actuated device with matching wall distance between the partition walls varying according to another embodiment of the present invention.

According to a third embodiment shown on FIG. 3, the primary partition wall 200 and the secondary partition wall 300 may form a wedge or a slope such that the gap or wall distance g between the primary partition wall 200 and the secondary partition wall 300 may increases from one side of the electrode chamber 500 to the other. The gradient of thickness of the gap g insures a smooth transition of the electrostatically actuated device 100 with voltage as will be discussed later.

At least one of the partition walls among the primary partition wall 200 and the secondary partition wall 300, which may have a wall distance g smaller than 600 μm between them, and preferably smaller than 200 μm between them, may comprise a primary electroconducting pad. According to the embodiment shown on FIG. 3, the wall distance g between the primary partition wall 200 and the secondary partition wall 300 may vary such as to have a slope.

More precisely, the wall distance g between the primary partition wall 200 and the secondary partition wall 300 varies such as to form an angle, between the primary partition wall 200 and the secondary partition wall 300, comprised between 0° and 60°, in particular between 0° and 45° and preferably between 0° and 30°.

Further, it is also possible to transpose this particular third embodiment to the first embodiment, for instance, by varying a dimension of electrode chamber 500 like height, length or the width.

Detailed Description of the Invention According to a $4^{th}$ Embodiment

Figure 4:
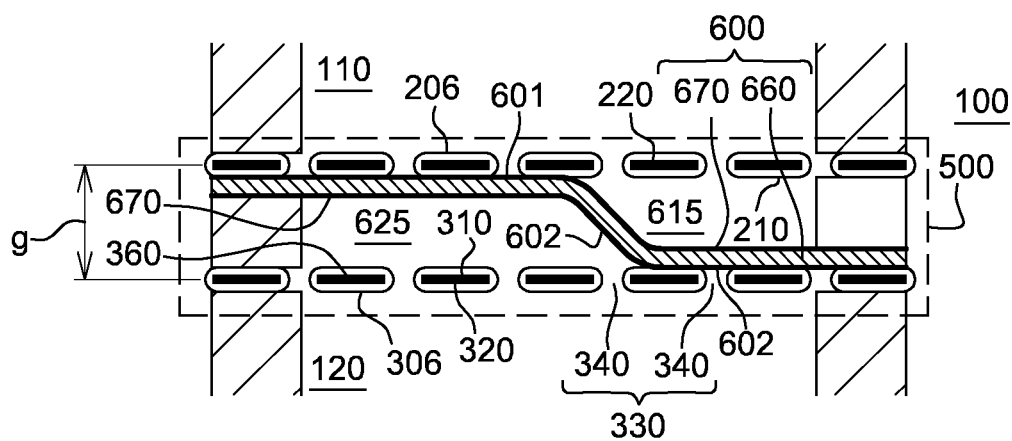
FIG. 4 illustrates an embodiment of the partition walls of the present invention.

According to a fourth embodiment shown on FIG. 4, the primary partition wall 200 and the secondary partition wall 300 may be a part of the electrode by being connected to the higher voltage and to the lower voltage or vice versa and the PET deformable electrode 600 at the common reference or electrical ground. More precisely, there may be an primary electroconducting pad 270 on the first primary surface 210 and an secondary electroconducting pad on the first secondary surface 310 which is electrically connected to the higher voltage and to the lower voltage or vice versa and the PET deformable electrode 600 may comprise a deformable electroconducting layer 670 at the common reference or electrical ground.

In a particular embodiment wherein the deformable electroconducting layer 670 may be disposed on both side of the deformable electrode 600, the primary partition wall 200 and the secondary partition wall 300 will be insulated by an insulating layer 206 which can be deposit by at least of the method, but not limited thereto, among chemical vapor deposition like plasma-enhanced chemical vapor deposition or low-pressure chemical vapor deposition for example, physical vapor deposition, e.g. sputtering or Electron beam physical vapor deposition, atomic layer deposition and/or serigraphy. This insulating layer 206 may be made of a parylene, aluminium oxide, silicon dioxide or glass for instance.

Indeed the primary partition wall 200 may comprise a first insulating layer 206 configured to insulate the deformable electrode 600 from the primary partition wall 200. In particular, the deformable electrode 600 may comprise at least one electroconducting portion and/or the primary partition wall 200 may comprise a primary electroconducting pad 270. In this configuration the primary partition wall 200 comprises a first insulating layer 206 configured to insulate the at least one electroconducting portion of the deformable electrode 600 from the primary electroconducting pad 270 of the primary partition wall 200.

Similarly the secondary partition wall 300 may comprise a second insulating layer 306 configured to insulate the deformable electrode 600 from the secondary partition wall 300. In particular, the deformable electrode 600 may comprise at least one electroconducting portion and/or the secondary partition wall 300 may comprise a secondary electroconducting pad. In this configuration the secondary partition wall 300 comprises a second insulating layer 306 configured to insulate the at least one electroconducting portion of the deformable electrode 600 from the secondary electroconducting pad of the secondary partition wall 306.

The partition walls may be thus isolated from the deformable electrode which may be coated on both sides by an electroconducting layer like for example aluminum conducting layer. The two sides of the PET deformable electrode can be connected electrically together, forming the ground/common electrode. Then each of the metallic partition walls may be an electrode. The intermediate deformable portion 602 may be at 0V approximately in the middle of the range. When applying the voltage between the common electrode and one of the partition walls will tend to displace the PET deformable electrode 600 and more precisely the intermediate deformable portion 602 of the PET deformable electrode 600 to the right for example.

The first primary surface 210 comprises a primary electroconductive surface area 260. This primary electroconductive surface area 260 may be partially or entirely insulated from the deformable electroconducting layer 670 of the deformable electrode 600 via the first insulating layer 206 as mentioned above. This first insulating layer may insulate partially or entirely the primary electroconductive surface area 260 such as there is no electrical contact between the primary electroconductive surface area 260 of the first primary surface 210 and the deformable electroconducting layer 670 of the deformable electrode 600. In this particular embodiment, the deformable electroconducting layer 670 may be on one side of the deformable dielectric layer 660.

The first secondary surface 310 comprises a secondary electroconductive surface area 360. This secondary electroconductive surface area 360 may be partially or entirely insulated from the deformable electroconducting layer 670 of the deformable electrode 600 via the second insulating layer 306 as mentioned above. This insulating layer may insulate partially or entirely the secondary electroconductive surface area 360 such as this is no electrical contact between the secondary electroconductive surface area 360 of the first secondary surface 310 and the deformable electroconducting layer 670 of the deformable electrode 600. In this particular embodiment, the deformable electroconducting layer 670 may be on one side of the deformable dielectric layer 660.

In a particular embodiment, the primary electroconductive surface area 260 on the first primary surface 210 and the secondary electroconductive surface area 360 on the first secondary surface 310 may be partially or entirely insulated from the deformable electroconducting layer 670 of the deformable electrode 600 via the first insulating layer 206 and the second insulating layer 306 i.e. the deformable electroconducting layer 670 may be on both side of the deformable dielectric layer 660 i.e. the deformable dielectric layer 660 may be partially or totally sandwiched between two deformable electroconducting layers 670. In this configuration, the first insulating layer 206 and the second insulating layer 306 may face the deformable electroconducting layer 670 and/or to the deformable electrode.

Detailed Description of the Invention According to a 5$^{th}$ Embodiment

Figure 5:
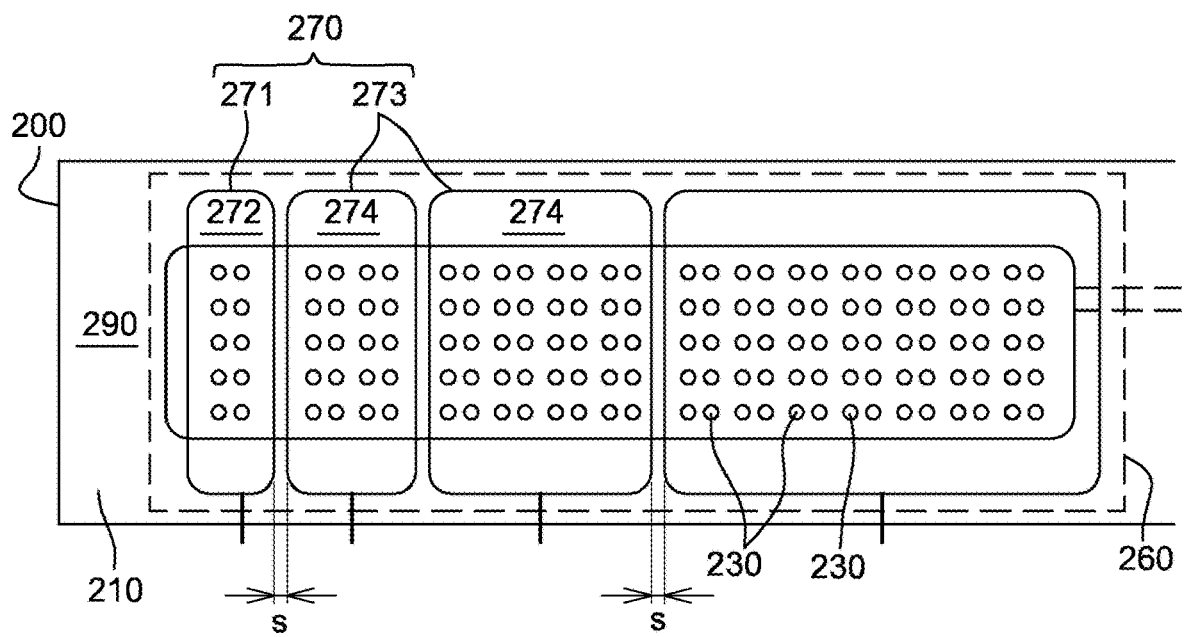
FIG. 5 presents a top view of an electrostatically actuated device with a main primary electroconducting pad 271 and a plurality of auxiliary primary electroconducting pad 274 according to another embodiment of the present invention.

FIG. 5 shows an embodiment of the primary partition wall 200 with a plurality of primary electroconducting pads 270 for digital control. For reasons of simplification and to ensure a better understanding of the electrostatically actuated device 100, only the primary partition wall 200 is represented. This embodiment may be literally transposed to the secondary partition wall 300 or to the deformable electrode 600.

In this variant the electrode of the primary partition wall 200 which means the primary electroconducting pad 270 may have been divided in several pads. Each pad of the primary electroconducting pad 270 may be electrified independently: Each pad will be either turn ON or turn OFF, thus pushing a volume of fluid which may be proportional to the area of the electrified pad. Each pad may have to be connected to a voltage source, corresponding to a voltage which may be sufficient to insure that all the area of the corresponding electrode may be pushed. According to this embodiment, the primary partition wall 200 may be made from an insulating material, and a thin metal film may be either deposited by coating methods, serigraphy on the primary partition wall 200, may be glued by macroscopic application or any other method. According to another embodiment, several metal partition walls could be supported by an underlying insulating supporting medium for mechanical support.

At least one of the partition walls among the primary partition wall 200 and the secondary partition wall 300, which may have a wall distance g smaller than 600 μm between them, and preferably smaller than 200 μm between them, may comprise a primary electroconducting pad. According to the embodiment shown on FIG. 3, the wall distance g between the primary partition wall 200 and the secondary partition wall 300 may vary such as to have a slope.

More precisely, the wall distance g between the primary partition wall 200 and the secondary partition wall 300 varies such as to form an angle, between the primary partition wall 200 and the secondary partition wall 300, comprised between 0° and 60°, in particular between 0° and 45° and preferably between 0° and 30°.

The primary electroconducting pad may comprise at least two primary electroconducting pad, which may have a pad spacing s comprised between 10 µm and 1 mm or between 10 µm and 500 µm between them, and the at least two primary electroconducting pad may cover, rather the primary electroconducting pad may cover at least partially the primary partition wall surface area 290, described above, with a primary electroconductive surface area 260.

The at least two primary electroconducting pad of the primary electroconducting pad may comprise a main primary electroconducting pad 271 having a main primary surface area 272 and at least one auxiliary primary electroconducting pad 273 having an auxiliary primary surface area 274. The main primary surface area 272 and the auxiliary primary surface area 274 may be comprised in the primary electroconductive surface area 260.

The main primary electroconducting pad 271 and the at least one auxiliary primary electroconducting pad 273 may be electrically insulated from each others. The primary electroconductive surface area 260 may comprise the main primary surface area 272 and the auxiliary primary surface area 274 since they may form the primary electroconducting pad.

The auxiliary primary surface area 274 may be defined by a geometric progression comprising a common ratio and a scale factor or an arithmetic progression comprising an initial term and a common difference. The main primary surface area 272 may be the scale factor of the geometric progression or the initial term of the arithmetic progression.

For example, in this case, where the main primary surface area 272 may be equal to one unity area, the first auxiliary primary surface area 274 may be equal to two unity areas and the second one may be equal to four unity areas. In this configuration, the deformable electrode 600 may be in physical contact between one, and seven unity areas. In other words, the first electrode chamber 500 may have until eight different pushed fluid volumes 611 which may allow fine tuning.

Another overall embodiment, which will be very advantageous, may be to combine the electrostatically actuated device 100 of FIG. 2 with the feature of FIGS. 4 and 5: this will be a bipolar electrostatically actuated device 100, and the zero-voltage focus will be tuned to be the intermediate-sight sharp vision, by adjusting the overall amount of second fluid for instance. Relative to the rest position of the fluids at 0V, the device will be able to either push the liquids in one direction or to pull them in the other direction actively. In the particular use of this device in an ophthalmic device, this means that the rest position of the ophthalmic device will be at intermediate distance vision. The pump will be able to activate the lens in either directions to either see to far vision or to close vision.

Further, it is possible to have pad structures on both partition walls i.e. on primary partition wall 200 and the secondary partition wall 300 and/or on the deformable electrode 600. The at least two primary electroconducting pad, main primary electroconducting pad 271 and the at least one auxiliary primary electroconducting pad 273, may not be necessary aligned between them or with at least two secondary electroconducting pad disposed on the secondary partition wall 300, main secondary electroconducting pad and the at least one auxiliary secondary electroconducting pad. In others words, the main secondary electroconducting pad may not be necessary aligned or facing the main primary electroconducting pad 271. It may also not be necessary to precise that each electroconducting pad of the at least two secondary electroconducting pad and/or the at least two primary electroconducting pad may have individually a regular polygon shape or an irregular polygon shape.

Detailed Description of the Structure of Partition Wall

Figure 6:
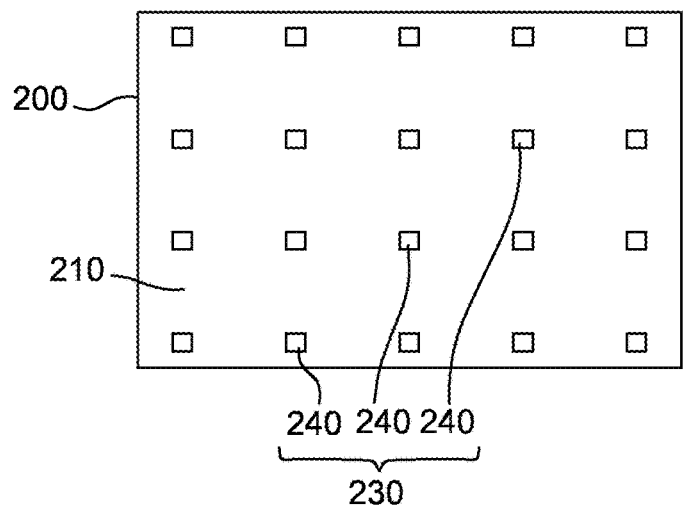
FIGS. 6 and 7 shows chamber cross-section with supporting primary wall 210 and chambers sizes according to different embodiments of the present invention.
Figure 7:
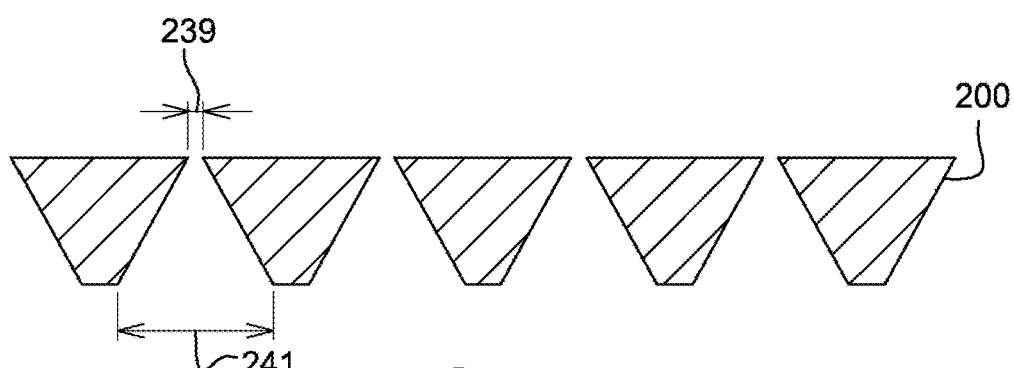

FIG. 6 shows a way to manufacture the microfluidic partition wall by using anisotropic etching of silicon wafers: this would enable to produce a pattern similar to the one sketched on FIG. 6, suitable for this invention.

In a particular embodiment of the present invention, at least one of the partition walls among the primary partition wall and the secondary partition wall is partially made of at least one crystalline or semi-crystalline material. More precisely, at least one of the partition wall among the primary partition wall 200 and the secondary partition wall 300 is made of at least one crystalline or semi-crystalline material like polymers, sol-gel, silicon, silicon dioxide, aluminum oxide, sapphire, germanium, gallium arsenide, indium phosphide, or an alloy of the preceding mentioned material.

An alternative to the previous embodiment may be that at least one of the partition walls among the primary partition wall and the secondary partition wall may be partially made of a porous material, natural fabrics or artificial fabrics. It may be also possible to use natural fabrics or artificial fabrics which may be ordered or disordered. In any case, the porous material, natural fabrics or artificial fabrics may be partially made of polymers, elastomers, amorphous carbon, Kevlar, carbon or metal.

The second primary fluid passage 240 of the plurality of second primary fluid passage 230, described above, may comprise a first primary opening on the first primary surface 210 having a first primary open surface area 239 and a second primary opening on the second primary surface 220 having a second primary open surface area 241; the first primary open surface area 239 may be smaller than the second primary open surface area 241.

The second secondary fluid passage 340 of the second secondary fluid passage 330 may comprise a first secondary opening on the first secondary surface 310 having a first secondary open surface area and a second secondary opening on the second secondary surface 320 having a second secondary open surface area; the first secondary open surface area may be greater than the second secondary open surface area.

The sum of the first primary open surface area 239 of the plurality of second primary fluid passage 230 may form a primary open surface area and/or the sum of the first secondary open surface area of the plurality of first secondary fluid passage may form a secondary open surface area.

Generally, the first primary open surface area 239 may be smaller than the second primary open surface area 241 and the ratio between the first primary open surface area 239 and the second primary open surface area 241 may be comprised between 0.001 and 0.5 and/or the first secondary open surface area is smaller than the second secondary open surface area and the ration between the first secondary open surface area and the second secondary open surface area may be comprised between 0.001 and 0.5.

The first primary open surface area 239 may be smaller than the primary partition wall surface area 290 and the ratio between the first primary open surface area 239 and the primary partition wall surface area 290 may be comprised between 0.001 and 0.5 and the first secondary open surface area may be smaller than the secondary partition wall surface area and the ratio between the first secondary open surface area and the secondary partition wall surface area may be comprised between 0.001 and 0.5.

The primary open surface area may be smaller than the primary partition wall surface area 290 and the ratio between the primary open surface area and the primary partition wall surface area 290 may be comprised between 0.001 and 0.5 and the secondary open surface area may be smaller than the secondary partition wall surface area and the ratio between the secondary open surface area and the secondary partition wall surface area may be comprised between 0.001 and 0.5.

Particularly, the ratio between the first primary open surface area 239 and the primary partition wall surface area 290 may be comprised between 0.01 and 0.4 and the ratio between the first secondary open surface area and the secondary partition wall surface area may be comprised between 0.01 and 0.4.

Particularly, the ratio between the primary open surface area and the primary partition wall surface area 290 may be comprised between 0.001 and 0.5 and the ratio between the secondary open surface area and the secondary partition wall surface area may be comprised between 0.001 and 0.5.

Of course, other technologies of etching could be applied as well: chemical anisotropic or isotropic etching of silicon, glass, ceramics, oxides, metals could be used, laser etching could be used etc. . . . .

Also it is also possible to consider an another way to manufacture the primary partition wall 200 with the plurality of second primary fluid passage 230 by using a porous material, made from polymers, elastomers, amorphous carbon, or aluminium oxide for example.

The use of natural or artificial fabrics made from any kind of interlaced fibers, either ordered or disordered, like polymers, Kevlar, carbon, metal for example could also be considered for the manufacture of the primary partition wall 200.

The primary partition wall 200 could also be made of a composite of several layers: a layer with the holes and a layer for supporting for example.

Detailed Description of the Control of the Electrostatically Actuated Device Control of the electrostatically actuated device 100 may be performed by voltage and/or capacitance and/or discrete volumes. The wall distance g between the primary partition wall 200 and the secondary partition wall 300 should be typically smaller than 600 µm, and preferably smaller than 200 µm depending on the overall dimensioning of the system. The electrostatically actuated device 100 can displace the fluid with a pressure difference given by:

$$\Delta P = (\varepsilon \varepsilon_0 / 2eg)(1-\gamma)V^2$$

Where $\Delta P$ may be the pressure difference induced between the first fluid and the second fluid which may be apart from the dielectric deformable electrode 600, $\varepsilon$ the dielectric constant of the dielectric deformable electrode 600, $\varepsilon_0$ the vacuum permittivity, e its thickness, g may be the gap between the primary partition wall 200 and the secondary partition wall 300 also known as wall distance, $\gamma$ may be the ratio between the primary open surface area and the primary partition wall surface area of the partition wall, and V may be the voltage difference between partition wall and dielectric deformable electrode 600. If one takes typical values for an experimental realization, $\varepsilon=3$, e=2 µm, g=200 µm, $\gamma=0.8$ and V=100V, one gets a pressure difference to be evaluated $\Delta P=300$ Pa, meaning that the device can pump liquids against an opposing pressure of that amount, in line with the need for ophthalmic applications.

As can be seen from the formula above, the electrostatic effect on pressure is proportional to the square of the voltage $V^2$. It is then possible to use alternating voltage to actuate the device. It is advantageous to use alternative voltage. Indeed, the use of ac voltages suppresses the duty on materials and liquids which could come to the continuous application of a single polarity voltage, leading to a long term decrease of efficiency of the device.

The formula above applies when the liquid which is pushed by the electrostatic field is insulating. As a consequence the fluids should be engineered suitably for the device to work correctly. For conducting liquids like water, they can be placed only in the portion of the device where no electric field is present. For example, in the embodiment 1, water can be present in chamber 625. For dielectric liquids, they can be placed in any chambers of any embodiment presented. For intermediate liquids which could be dielectric with a small conductivity, usually there is an ac voltage frequency above which the behavior of the liquid is almost purely dielectric and its conductivity can be neglected. it will be necessary to engineer the device to work in such a regime.

The control of the electrostatically actuated device 100 can be done through a variation of voltage, inducing a pressure variation. Such pressure variation would then correspond to a given volume pushed, the mutual relation between volume of fluid pushed and pressure would be given by the elasticity of the optical deformable membrane. In some cases, the elasticity of the deformable electrode which may be outside the electrostatically actuated device 100 may be not enough to insure an accurate value of the electrostatically actuated pumped volume.

The embodiment shown on FIG. 3 with a variable gap g allows spreading the electrostatically actuated device 100 response, such that at one voltage would correspond a given volume of fluid pushed. Indeed, in FIG. 2 for instance, there may be an abrupt voltage threshold where all the fluid may be pushed out of the electrostatically actuated device 100. In FIG. 3 the gradient insures a spread for the voltage response, thus enabling to control the quantity of fluid pushed by the electrostatically actuated device 100 by a precise control of the voltage.

It may be possible to control the electrostatically actuated device 100 through the capacitance of the system: when referring to FIG. 2, the overall capacitance between the common electrode, which may be the deformable electrode 600 and either the primary partition wall 200 or the secondary partition wall 300 varies with the position of the intermediate deformable portion 602 of the deformable electrode 600: at maximum voltage between common deformable electrode 600 and primary partition wall 200 for instance, the deformable electrode 600 will be applied to the opposite surface over the whole area of the device. The capacitance between these two electrodes will be maximum. So monitoring capacitance primary partition wall 200-common deformable electrode 600, or both primary partition wall 200-common deformable electrode 600 and the secondary partition wall 300-common deformable electrode 600, will lead to the knowledge of the volume of fluid that may have been displaced by the electrostatically actuated device 100, independently of the pressure. Thus the electrostatically actuated device 100 could be controlled by this capacitance with a required servo-control on this parameter.

The capacitance can be measured using an external apparatus (LCR bridge or any other capacitance meter) or by a small circuitry included in the miniaturized circuit aside to the function which is used as the device controller. These miniaturized circuits are already very much spread in ultra-miniaturized Application Specific Integrated Circuit, ASICs for short, to detect touch-pads for instance through so-called "capacitive sensing". There are several principles for these circuits. One can measure the frequency of a relaxation oscillator, which depends on the capacitance. Or one can apply an alternative current or alternative voltage signal to a series of two capacitors, one fixed of known value, the other being the unknown capacitor to be measured. Measuring the alternative voltage on the unknown capacitor provides a way to deduce the value of the unknown capacitance.

Another way of controlling the electrostatically actuated device 100 may be to separate the volume in discrete sub-volumes, by separating one of the electrode into different electrodes. FIG. 5 shows an example of set of primary electroconducting pads 270 having different shapes electroconducting pads, such that the wanted resolution on the displaced volume can be achieved. On FIG. 5, only the partition walls and its electroconducting pads may be shown, the rest of the device will be similar to preceding figures. In the example of the FIG. 5, the primary partition wall 200 may be made from an insulating material and the set of primary electroconducting pads 270 may be deposited on the primary partition wall 200. External connections will allow to set different voltages to the different electroconducting pads. Each electroconducting pads will be either connected to the source of voltage insuring that the corresponding zone may be activated. The other electroconducting pads will be grounded, such that the corresponding zones may be inactivated. The voltage should be sufficiently high such that in the activated zones, the fluid may be efficiently pushed by the deformable electrode 600. Each zone may be thus binary activated ON or OFF. FIG. 5 shows a particular embodiment where different areas for the electroconducting pads, each electroconducting pad having a proportional surface of the preceding one. This may allow producing different steps of the injected volume of the electrostatically actuated device 100 while using only N electrodes. Another way would be to include intermediate voltages to produce higher resolution.

The embodiment shown on FIG. 2 may be particularly simple for two fluids actuation. The one-sided metalized deformable electrode 600 may be trapped between primary partition wall 200 and the secondary partition wall 300. The partition wall which may be on the reverse side of the PET metallization should be conducting as it will serve as one electrode. The metallization of the PET deformable electrode 600 would be the other electrode. When applying the voltage, the deformable electrode 600 may be attracted to the other partition wall electrode, thus pushing the fluid which may be on the side of the conducting partition wall serving as electrode. The FIG. 8 shows an experimental record of such variations.

Figure 8:
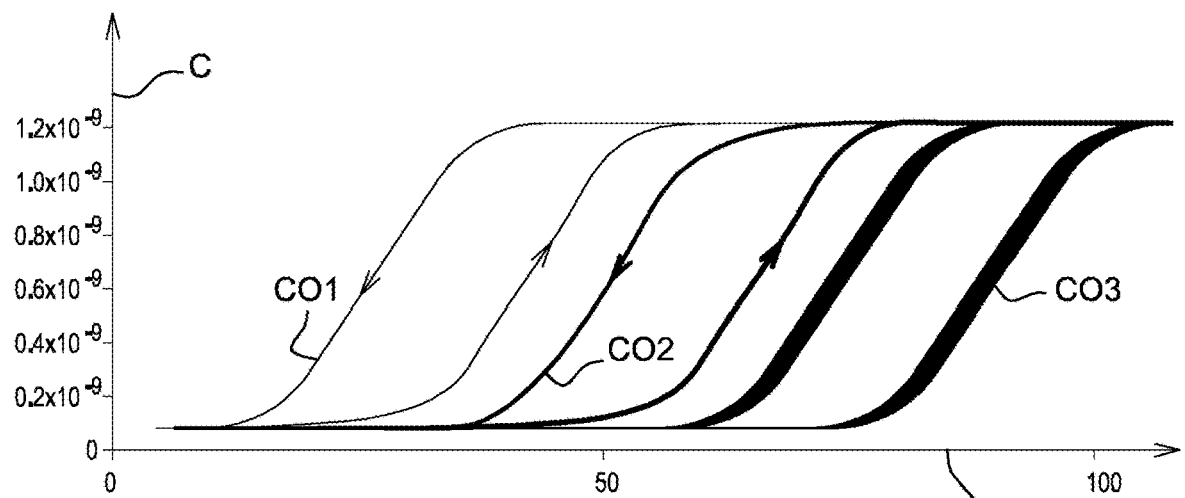
FIG. 8 illustrates an experimental record according to another embodiment of the present invention.

In FIG. 8, the curve C01 corresponds to δP=100 Pa, the curve C02 to δP=200 Pa and the curve C03 to δP=300 Pa. The graph shows the capacitance C plotted against the voltage V of the sample: as explained elsewhere in the present application, the capacitance reflects the amount of deformable film which may be against the partition wall. The graph shows that the film exhibits a transition at a given voltage between the off-state and the on-state. This transition voltage clearly varies with the pressure against which the electrostatically actuated device 100 may have to operate. One also sees on the above figure that the phenomenon exhibits some hysteresis, the ascending and descending curves being different.

Detailed Description of the Positions of the Deformable Electrode

The various positions of the deformable electrode 600 will now be described in reference to FIG. 9.

In each position of the deformable electrode 600, said electrode may comprise a first deformable portion 601, an intermediate deformable portion 602 and a second deformable portion 603 such that:
  the first deformable portion 601 is in physical contact with or close to the first primary surface 210;
  the second deformable portion 603 is in physical contact with or close to the first secondary surface 310; and
  the intermediate deformable portion 602 links the first deformable portion 601 and the second deformable portion 603 and crosses the wall distance between the first primary surface 210 and the first secondary surface 310; The intermediate deformable portion 602 may be neither in physical contact with the first primary surface 210 nor the first secondary surface 310

Upon actuation of the deformable electrode 600 in a first direction, the intermediate deformable portion is moved in a first direction and the first fluid may be pushed from the first electrode chamber 615 to the first chamber 110 via the plurality of second primary fluid passages 230, which means when the volume of the first electrode, namely the first electrode volume 611 may be decreased and simultaneously the number of obstructed second primary fluid passage 240 of the plurality of second primary fluid passage 230 may increase or the first deformable portion 601 may be close to the first primary surface 210 such as to impede the first fluid to move from the first electrode chamber 615 to the first chamber 110 or vice versa via the plurality of second primary fluid passages 230.

Upon actuation of the deformable electrode 600 in a second opposite direction, the intermediate deformable portion is moved in a second direction and the second fluid may be displaced toward the second chamber 120 via the plurality of second secondary fluid passages 330 when the volume of the second electrode chamber 625, namely the second electrode volume 621 may be decreased and simultaneously the number of non obstructed or uncovered second secondary fluid passage 340 of the plurality of second secondary fluid passage 330 may increase or the second deformable portion 603 may be close to the first secondary surface 310 such as to impede the second fluid to move from the second electrode chamber 625 to the second chamber 120 or vice versa via the plurality of second secondary fluid passages 330.

The intermediate deformable portion 602 may form partially the first electrode chamber 615 with the second deformable portion 603 and may form also partially the second electrode chamber 625 with the first deformable portion 601.

Figure 9:
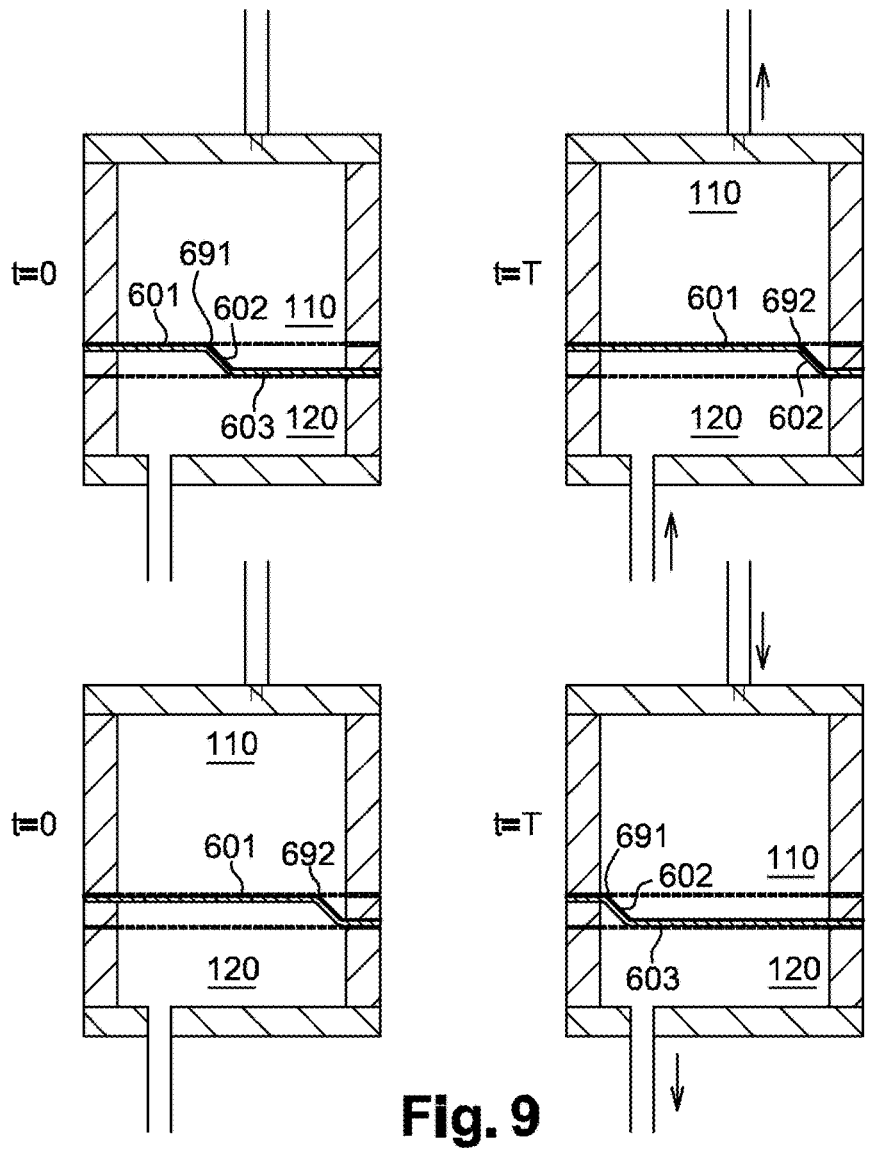
FIG. 9 represents a decomposition of time and movement of the deformable electrode according to another embodiment of the present invention; and, FIG. 10 illustrates a particular embodiment using the electrostatically actuated device 100 in spectacles according to another embodiment of the present invention.

The first position 691 and the second position 692 may be defined relatively to the variation of the first deformable portion 601 as shown in FIG. 9. In other words, the first position 691 may define a first primary contact surface of the first deformable portion 601. The first primary contact surface of first deformable portion 601 may represent the contact surface between the first deformable portion 601 and the first primary surface 210 at the first position 691. The second position 692 may define a second primary contact surface of the first deformable portion 601. The second primary contact surface of first deformable portion 601 may represent the contact surface between the first deformable portion 601 and the first primary surface 210 at the second position 692. The second primary contact surface is greater than the first primary contact surface. In others words, the capacity formed by the first deformable portion 601 and the first primary surface 210 may increase when the deformable electrode 600 is actuated from the first position 691 to the second position 692 and conversely the capacity formed by the first deformable portion 601 and the first primary surface 210 may decrease when the deformable electrode 600 is actuated from the second position 692 to the first position 691. For the second deformable portion 603, the second position 692 may define a second secondary contact surface of the second deformable portion 603. The second secondary contact surface of second deformable portion 603 may represent the contact surface between the second deformable portion 603 and first secondary surface 310 at the second position 692. The first position 691 may define a first secondary contact surface of the second deformable portion 603. The first secondary contact surface of second deformable portion 603 may represent the contact surface between the second deformable portion 603 and the first secondary surface 310 at the first position 691. The second secondary contact surface is smaller than the first secondary contact surface. In others words, the capacity formed by the second deformable portion 603 and the first secondary surface 310 may decrease when the deformable electrode 600 is actuated from the first position 691 to the second position 692 and conversely the capacity formed by the first deformable portion 601 and the first secondary surface 310 may increase when the deformable electrode 600 is actuated from the second position 692 to the first position 691.

As it can be understood, when the deformable electrode 600 may move from the first position 691 to the second position 692, the contact surface between the first deformable portion 601 and the first primary surface 210 may increase from the first primary contact surface to the second primary contact surface and simultaneously the contact surface between the second deformable portion 603 and first secondary surface 310 may decrease from the first secondary contact surface to the second secondary contact surface.

And reciprocally, when the deformable electrode 600 may move from the second position 692 to first position 691, the contact surface between the first deformable portion 601 and the first primary surface 210 may decrease from the second primary contact surface to the first primary contact surface and simultaneously the contact surface between the second deformable portion 603 and first secondary surface 310 may increase from the second secondary contact surface to the first secondary contact surface.

As it can be construed, there may be an antagonist effect or the first electrode chamber 615 and the second electrode chamber 625 may be antagonists. The antagonist effect may be observed when the deformable electrode may be actuated from one position to the other. Indeed, during the deformation of the deformable electrode, the number of not obstructed second primary fluid passage 240 may decrease when the first deformable portion 601 may obstruct partially the plurality of second primary fluid passage 230 since the contact surface, between the first deformable portion 601 and the first primary surface 210, may increase from the first primary contact surface to the second primary contact surface. The first fluid may move from the first electrode chamber 615 to the first chamber 110 via the plurality of second primary fluid passages 230, and the volume of the first electrode chamber 615, namely the first electrode volume 611 may be decreased.

In the same time, the number of not obstructed second secondary fluid passages 330 may increase when the second deformable portion 603 may be not partially in physical contact with the plurality of second secondary fluid passages 330 since the contact surface, between the second deformable portion 603 and the first secondary surface 310, may decrease from the first secondary contact surface to second secondary contact surface. The second fluid may move from the second chamber 120 to the second electrode chamber 625 via the plurality of second secondary fluid passages 330, and the volume of the second electrode chamber 500, namely the second electrode volume 621 may be increased.

Detailed Description of the Spectacles

Figure 10:
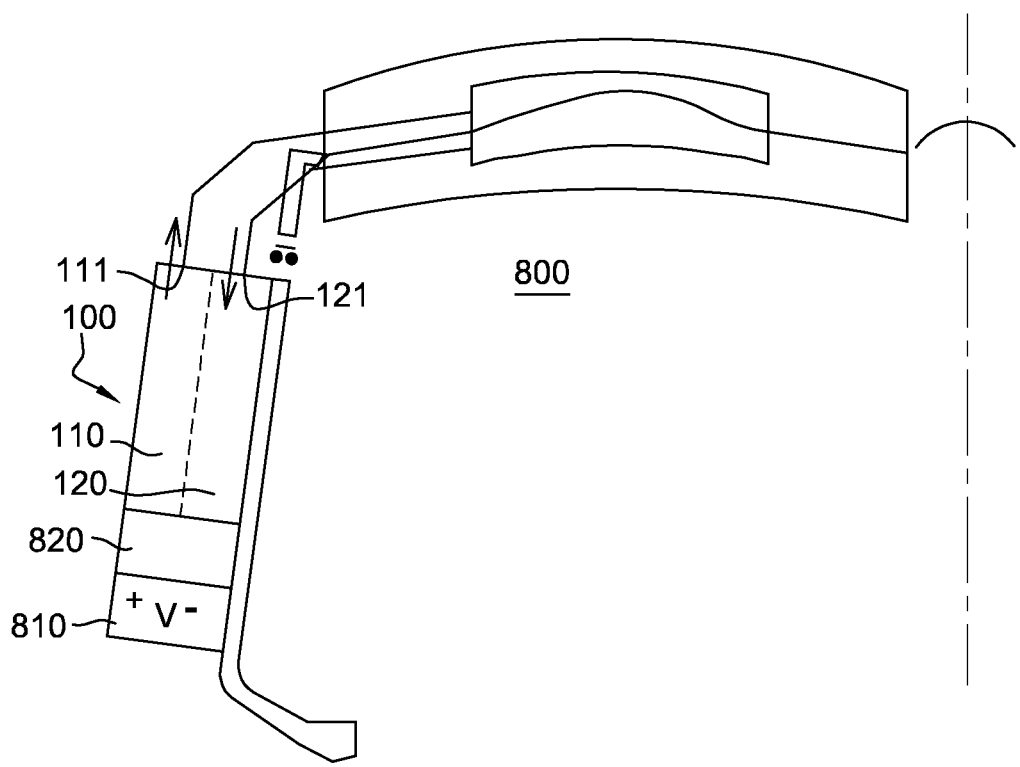

FIG. 10 shows spectacles 800, as described in the patent application FR 16/, comprising the electrostatically actuated device 100 according to one of the previous embodiments using fluids pushed by the device. In particular, two electrostatically actuated devices 100 are located respectively in the two spectacle's 800 temples. The spectacles 800 may comprise a power supply 810 for the electrostatically actuated devices 100 configured to be connected to the electrode and to the deformable electrode in order to actuate the deformable electrode 600. The ratio between the first deformable portion 601 in physical contact with the first primary surface 210 and the second deformable portion 603 in physical contact with the first secondary surface 310 may be controlled via a voltage controller 820. This voltage controller 820 may be configured to supply an alternative current to the deformable electrode from the power supply 810. The first chamber 110 and the second chamber 120 may be fluidly connected to two halves of an active glass, one posterior and one anterior, such as to form an inside cavity for the fluids. A deformable membrane, called optical deformable membrane, may be clamped between the two halves, separating the two fluid's compartments. Varying the pressure difference between the two fluids compartments will deform the optical deformable membrane, thus changing the optical power as the two fluids may have different indices of refraction. Everything in the spectacles 800 glasses may be transparent. Preferably, one will choose the two halves having two different indices of refraction, each halves having an index matched to the corresponding fluid's index. This will be advantageous, making invisible the fluid's cavity and the tunnels bringing the fluids to the central region.

TABLE 1

Low index liquids

| Low index liquids | Typical refractive index nD |
|---|---|
| Air | 1.00 |
| Fluorinert FC77 | 1.28 |
| Water | 1.33 |
| Silicon oil | 1.40 |

This first fluid may be chosen among a liquid having high index refraction as shown in table 1.

TABLE 2

High index liquids

| High index liquids | Typical refractive index nD |
|---|---|
| Water | 1.33 |
| Half phenylated silicon oil | 1.55 |
| Benzothioazole | 1.64 |
| α-chloronaphtalene | 1.633 |

The electrostatically actuated device 100 is able to electrostatically actuate reversibly about 150 μl of the first fluid against the second fluid. The electrostatically actuated device 100 should be able to maintain a pressure difference between the two fluid channels of the order of 200 Pa, preferably 400 Pa. Fluid flow should be at least 100 μl/s, preferably 200 μl/s. These performances is be attained with fluids of viscosities up to 100 centistokes or cs for short, preferably up to 10 cs.

INDUSTRIAL APPLICABILITY

It may be evident from the above description that the main use of this device will be in electronic spectacles 800. Nevertheless, it could be applied to any ocular lens or any device which may be placed before a human eye, like ocular lenses of microscopes, telescopes, photoropters, fundus cameras and all ophthalmic apparatus.

In addition, the described device 100 can be used in microfluidic devices for biological applications, tests, diagnosis, medical devices. Such medical devices include contact lenses, intraocular implants but non-optical medical devices like small electrostatically actuated devices 100 for drug delivery of small electrostatically actuated devices 100 for biological fluids analysis external as well as implanted in a living body, in fact all apparatus where a limited amount of fluid needs to be pushed with small power consumption.

In addition the device 100 can be used in any fluidic device used to displace fluids in any of the following domains like chemistry, physics, chemical engineering, biology, biological engineering, environment engineering, chemical industry, aeronautics, electronic industry, electronic devices etc. . . . ."

The invention claimed is:

1. An electrostatically actuated device, comprising:
   a first chamber, the first chamber comprising a first primary fluid passage; the first primary fluid passage emerging outwardly from the first chamber;
   a primary partition wall, the primary partition wall comprising a first primary surface, a second primary surface and a plurality of second primary fluid passages; the second primary surface of the primary partition wall defines at least partially the first chamber;
   an electrode chamber, the electrode chamber is defined adjacent to the first primary surface;
   a deformable electrode, the deformable electrode comprising a first deformable electrode surface, a second deformable electrode surface; the deformable electrode is disposed in the electrode chamber such as to form a first electrode chamber and a second electrode chamber;
   an electrode, the electrode being configured to cooperate with the deformable electrode such as to actuate the deformable electrode between at least a first position and a second position;
   the first electrode chamber is comprised between the first deformable electrode surface and the first primary surface and the first electrode chamber fluidly communicates with the first chamber via the plurality of second primary fluid passages when the deformable electrode is actuated between at least the first position and the second position, and
   the first electrode chamber is fluidly isolated from the second electrode chamber, and wherein the electrostatically actuated device is configured to reversibly push a limited fluid volume only.

2. The electrostatically actuated device according to claim 1, comprising:
   a second chamber, the second chamber comprising a first secondary fluid passage; the first secondary fluid passage emerging outwardly from the second chamber;
   a secondary partition wall, the secondary partition wall comprising a first secondary surface, a second secondary surface and a plurality of second secondary fluid passages; the first secondary surface faces the first primary surface, the secondary partition wall defines at least partially the second chamber;
   the second electrode chamber is comprised between the second deformable electrode surface and the first secondary surface and the second electrode chamber fluidly communicates with the second chamber via the plurality of second secondary fluid passages when the deformable electrode is actuated between at least the first position and the second position.

3. The electrostatically actuated device according to claim 2, wherein a dimension of the electrode chamber and/or a wall distance between the primary partition wall and the secondary partition wall is smaller than 600 μm.

4. The electrostatically actuated device according to claim 3, wherein the wall distance between the primary partition wall and the secondary partition wall varies.

5. The electrostatically actuated device according to claim 1, wherein the deformable electrode comprises a deformable dielectric layer and at least one electroconducting portion.

6. The electrostatically actuated device according to claim 1, wherein the primary partition wall comprises a primary partition wall surface area and a primary electroconducting pad; the primary electroconducting pad comprises a main primary electroconducting pad having a main primary surface area and at least one auxiliary primary electroconducting pad having an auxiliary primary surface area; the main primary electroconducting pad and the at least one auxiliary primary electroconducting pad are electrically insulated from each other.

7. The electrostatically actuated device according to claim 6, wherein the deformable electrode comprises a deformable dielectric layer and at least one electroconducting portion and the primary partition wall comprises a first insulating layer configured to insulate the primary electroconducting pad of the primary partition wall from the at least one electroconducting portion of the deformable electrode.

8. The electrostatically actuated device according to claim 6, wherein pad spacing between the main primary electroconducting pad and the at least one auxiliary primary electroconducting pad and/or between the at least one auxiliary primary electroconducting pad and another primary electroconducting pad is comprised between 10 μm and 1 mm.

9. The electrostatically actuated device
according to claim 2, wherein the plurality of second primary fluid passages comprises a first primary opening on the first primary surface having a first primary open surface area and a second primary opening on the second primary surface having a second primary open surface area: the first primary open surface area is smaller than the second primary open surface area; and/or, wherein the plurality of second secondary fluid passages comprises a first secondary opening on the first secondary surface having a first secondary open surface area and a second secondary opening on the second secondary surface having a second secondary open surface area: the first secondary open surface area is greater than the second secondary open surface area.

10. The electrostatically actuated device according to claim 9, wherein the primary partition wall comprises a primary partition wall surface area and the secondary partition wall comprises a surface area and a sum of the first primary open surface area of the plurality of second primary fluid passages form a first primary open surface area and a sum of the first secondary open surface area of the plurality of second secondary fluid passages form a secondary open surface area, wherein a ratio between:
   the first primary open surface area and the second primary open surface area is comprised between 0.001 and 0.5;
   the first primary open surface area and the primary partition wall surface area is comprised between 0.001 and 0.5;
   the first secondary open surface area and the second secondary open surface area is comprised between 0.001 and 0.5; and/or
   the first secondary open surface area and the surface area of the secondary partition wall is comprised between 0.001 and 0.5.

11. The electrostatically actuated device according to claim 2, wherein at least one of the primary partition wall and the secondary partition wall is partially made of at least one crystalline material.

12. The electrostatically actuated device according to claim 1, comprising a power supply configured to actuate the deformable electrode and a voltage controller configured to supply an alternative current and/or an alternative voltage from the power supply to the deformable electrode.

13. Spectacles comprising an electrostatically actuated device according to claim 1.

14. The electrostatically actuated device according to claim 4, wherein the deformable electrode comprises a deformable dielectric layer and at least one electroconducting portion.

15. The electrostatically actuated device according to claim 14, wherein the primary partition wall comprises a primary partition wall surface area and a primary electroconducting pad; the primary electroconducting pad comprises a main primary electroconducting pad having a main primary surface area and at least one auxiliary primary electroconducting pad having an auxiliary primary surface area; the main primary electroconducting pad and the at least one auxiliary primary electroconducting pad are electrically insulated from each other.

16. The electrostatically actuated device according to claim 15, wherein the deformable electrode comprises a deformable dielectric layer and at least one electroconducting portion and the primary partition wall comprises a first insulating layer configured to insulate the primary electroconducting pad of the primary partition wall from the at least one electroconducting portion of the deformable electrode.

17. The electrostatically actuated device according to claim 16, wherein pad spacing between the main primary electroconducting pad and the at least one auxiliary primary electroconducting pad and/or between the at least one auxiliary primary electroconducting pad and another is comprised between 10 μm and 1 mm.

* * * * *